US010341295B2

(12) United States Patent
Laswell et al.

(10) Patent No.: US 10,341,295 B2
(45) Date of Patent: Jul. 2, 2019

(54) SECURITY AND ACCESS CONTROL

(71) Applicant: Trend Micro Incorporated, Tokyo (JP)

(72) Inventors: Matthew Laswell, Austin, TX (US);
Wei Lu, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 232 days.

(21) Appl. No.: 15/195,247

(22) Filed: Jun. 28, 2016

(65) Prior Publication Data
US 2016/0308832 A1 Oct. 20, 2016

Related U.S. Application Data

(63) Continuation of application No. PCT/US2014/011652, filed on Jan. 15, 2014.

(51) Int. Cl.
*H04L 29/06* (2006.01)
*H04L 29/08* (2006.01)
(Continued)

(52) U.S. Cl.
CPC ........ *H04L 63/0254* (2013.01); *G06F 21/554* (2013.01); *H04L 63/105* (2013.01);
(Continued)

(58) Field of Classification Search
CPC ............ H04L 61/2514; H04L 61/2557; H04L 63/0254; H04L 63/0245; H04L 63/105; H04L 63/205; H04L 67/02; H04L 67/10; H04L 63/0263; H04L 63/20; H04L 63/101; H04L 63/0272; H04L 29/12207;
(Continued)

(56) References Cited

U.S. PATENT DOCUMENTS 7,949,637 B1 * 5/2011 Burke ................... G06F 3/0605
707/655
8,806,570 B2 * 8/2014 Barton .................... H04L 63/20
726/1
(Continued)

FOREIGN PATENT DOCUMENTS

EP 2175603 A1 * 4/2010 ......... H04L 63/0245
EP 2175603 A1 4/2010

*Primary Examiner* — William J. Goodchild
*Assistant Examiner* — Ali H. Cheema
(74) *Attorney, Agent, or Firm* — Okamoto & Benedicto LLP

(57) ABSTRACT

According to an example, security and access control may include receiving traffic that is related to an application tier of a plurality of application tiers, and that is to be routed to another application tier or within the application tier. The attributes of the traffic related to the application tier may be analyzed, and based on the analysis, an application related to the traffic and a type of the traffic may be determined. The type of the traffic may be compared to a policy related to the application to determine whether the traffic is valid traffic or invalid traffic. Based on a determination that the traffic is valid traffic, the valid traffic may be forwarded to an intended destination. Further, based on a determination that the traffic is invalid traffic, the invalid traffic may be forwarded to a predetermined destination or blocked.

12 Claims, 9 Drawing Sheets

(51) Int. Cl.
*G06F 21/55* (2013.01)
*H04L 12/46* (2006.01)
*H04L 29/12* (2006.01)

(52) U.S. Cl.
CPC ............ *H04L 63/205* (2013.01); *H04L 67/02* (2013.01); *H04L 67/10* (2013.01); *H04L 12/4625* (2013.01); *H04L 29/12207* (2013.01); *H04L 61/2514* (2013.01); *H04L 61/2557* (2013.01); *H04L 63/0245* (2013.01); *H04L 63/0263* (2013.01); *H04L 63/0272* (2013.01); *H04L 63/10* (2013.01); *H04L 63/101* (2013.01); *H04L 63/14* (2013.01); *H04L 63/20* (2013.01)

(58) Field of Classification Search
CPC .......... H04L 29/12367; H04L 12/4625; H04L 63/14; G06F 21/554; G06F 9/44505; G06F 3/0605
USPC .......... 709/229; 713/152; 715/234; 707/655; 370/395.53
See application file for complete search history.

(56) References Cited

U.S. PATENT DOCUMENTS

| | | |
|---|---|---|
| 2003/0115344 A1 | 6/2003 | Tang et al. |
| 2006/0075462 A1 | 4/2006 | Golan et al. |
| 2006/0098659 A1* | 5/2006 | Chinner .................. H04L 69/16 370/394 |
| 2008/0025230 A1* | 1/2008 | Patel .................... H04L 41/5022 370/252 |
| 2009/0213859 A1* | 8/2009 | De Silva ............. H04L 12/4625 370/395.53 |
| 2011/0296053 A1* | 12/2011 | Medved ................ H04L 67/104 709/241 |
| 2012/0079559 A1 | 3/2012 | Reznik et al. |
| 2012/0144187 A1 | 6/2012 | Wei et al. |
| 2013/0332818 A1* | 12/2013 | Speek ................. G06F 9/44505 715/234 |
| 2014/0317738 A1* | 10/2014 | Be'ery .................... H04L 63/14 726/23 |

* cited by examiner

SECURITY AND ACCESS CONTROL

CROSS-REFERENCE TO RELATED APPLICATION

This application is a continuation of International Application No. PCT/US2014/011652, with an International Filing Date of Jan. 15, 2014, which is incorporated herein by reference in its entirety.

BACKGROUND

Information security typically includes the defense of information, for example, from unauthorized access, use, or disclosure. In the field of information security and other such fields, control of access to information typically includes the selective restriction of access to a resource that contains the information that is to be defended. Firewalls, intrusion prevention systems (IPSs), cryptography, and other monitoring techniques are typically used in the field of information security for defense of information from unauthorized access.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
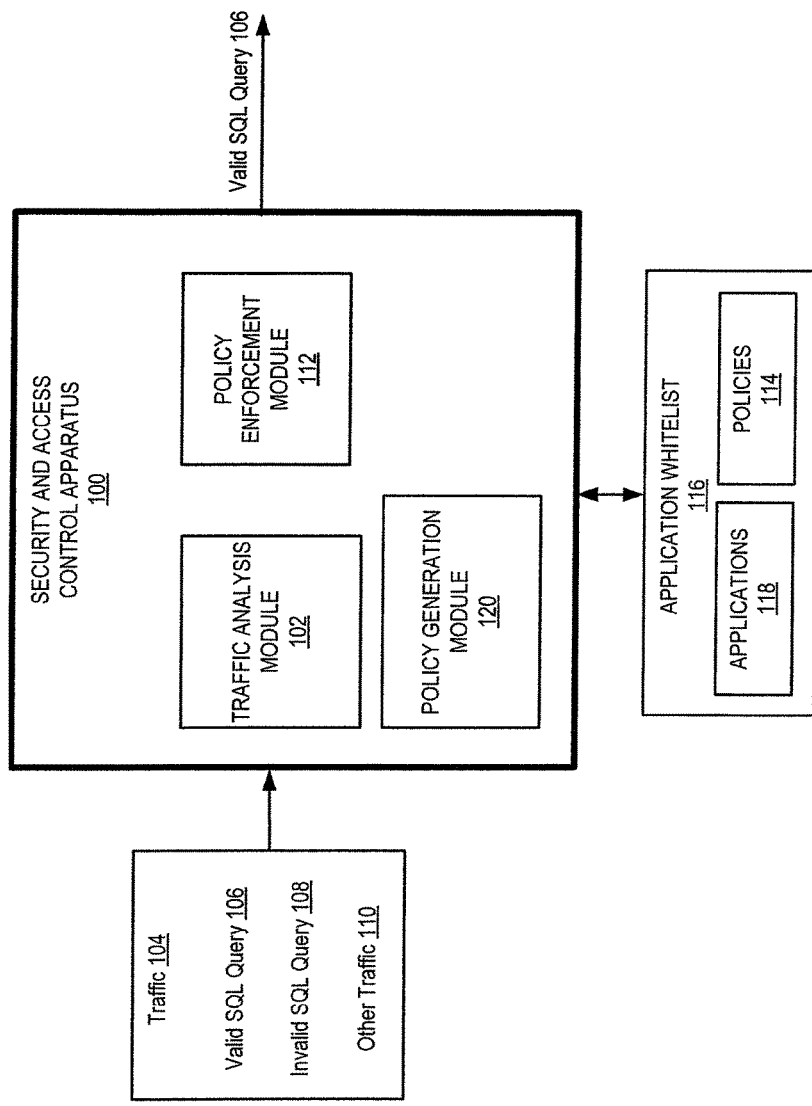
FIG. 1 illustrates an architecture of a security and access control apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

In modern computing architectures, the architectural layout may be distributed across multiple computing resources. For example, in distributed processing, components of a job may be divided into smaller sub-components and allocated across many physical or virtual computing resources. Modern web applications may also be divided into n-tier architectures in order to provide, for example, scalability, flexibility, and reusability. For example, web applications may use a three tier (i.e., layer) architecture that includes a presentation tier which handles the user interface, a logic tier which runs the internal logic of the application, and a database (i.e., persistence) tier which contains the data which the application is to access during its lifecycle. The computing resources involved in such architectures may include separate application tiers running on disparate physical servers. For example, the presentation tier may be implemented on a web server, the logic tier may be implemented on an application server, and the database tier may be implemented on a database server. Alternatively or additionally, the computing resources involved in such architectures may include machine readable instructions based components (e.g., servers) running on virtual machines (VMs).

Security for such computing architectures may be applied, for example, by using a firewall to prevent unauthorized access to a database server. However, once an unauthorized user is able to penetrate one tier (e.g., the web server) the unauthorized user may gain unfettered access to the other tiers (e.g., the application server and/or the database server). Thus, an unauthorized user may exploit vulnerabilities in a web server that hosts a user interface. Once the unauthorized user has bypassed the security of the web server, the unauthorized user may issue queries to the database server. At the database server, the unauthorized user may withdraw sensitive customer data, or implant the unauthorized user's data into the database.

According to examples, a security and access control apparatus and a method for security and access control are disclosed herein. The apparatus and method disclosed herein may use granular application fingerprinting and control to embed security within multi-tier, parallel, and distributed computing architectures. The granular application fingerprinting may include whitelisting of specific application interactions. For example, the apparatus and method disclosed herein may monitor and control interactions between tiers of an application, and allow access patterns that are explicitly permitted. Alternatively or additionally, the apparatus and method disclosed herein may monitor and control interactions within a single tier of an application. For example, in a virtual environment, if a database tier is implemented by multiple VMs, if one of the VMs is compromised, the apparatus and method disclosed herein may prevent the compromised VM from accessing other VMs. Thus, the apparatus and method disclosed herein may also monitor and control interactions between computing elements that perform the same or similar functions within a computing environment (e.g., across VMs in a multi-tenant virtual environment).

According to an example, the security and access control apparatus disclosed herein may include a traffic analysis module to receive traffic (e.g., structured query language (SQL) queries) that is related to an application tier of a plurality of application tiers, and that is to be routed to another application tier of the plurality of application tiers or that is to be routed within the application tier. The traffic analysis module may analyze attributes of the traffic related to the application tier, determine an application related to the traffic based on the attribute analysis, and determine a type of the traffic (e.g., a SQL query) based on the attribute analysis. A policy enforcement module may determine a policy from a plurality of policies respectively directed to each application tier of the plurality of application tiers of the application, and compare the type of the traffic to the policy to determine whether the traffic is valid traffic (e.g., a valid SQL query) or invalid traffic (e.g., an invalid SQL query or other traffic that may include SQL or non-SQL traffic). Based on a determination that the traffic is valid traffic, the policy enforcement module may forward the valid traffic to an intended destination (e.g., another application tier) of the valid traffic. Further, based on a determination that the traffic is invalid traffic, the policy enforcement module may forward the invalid traffic to a predetermined destination (e.g., a destination for invalid traffic) or block the invalid traffic.

The modules and other elements of the security and access control apparatus may be machine readable instructions stored on a non-transitory computer readable medium. In addition, or alternatively, the modules and other elements of the security and access control apparatus may be hardware or a combination of machine readable instructions and hardware.

The apparatus and method disclosed herein may integrate security into applications, for example, by protecting each application tier from the other application tiers without the need to alter to the application. The apparatus and method disclosed herein may allow for scaling related to applications. For example, as an application grows in popularity and the various tiers thereof are distributed across more physical servers, the security provided by the apparatus and method disclosed herein may remain with the various application tiers. For example, any traffic related to applications may be routed through the apparatus disclosed herein in the same manner as prior to scaling. As the tiers of an application are distribution to geographically distant datacenters, any traffic related to such applications may be routed through the apparatus disclosed herein in the same manner as prior to distribution.

The apparatus and method disclosed herein may also support cloud computing. For example, the apparatus and method disclosed herein may support multi-tenant environments with a relatively large number of physical servers running a relatively larger number of VMs, and both physical and machine readable instructions defined networks. Based, for example, on a description of the computing resources that are providing services, and a configuration of a whitelist accordingly, the apparatus and method disclosed herein may provide security for such computing architectures. The whitelist may include policies related to valid and/or invalid traffic flow from one application tier to another, or valid and/or invalid traffic flow within an application tier.

The apparatus and method disclosed herein may provide various levels of granularity with respect to application control. For example, the apparatus and method disclosed herein may prevent unexpected and unauthorized applications from accessing, for example, a database server. Further, the apparatus and method disclosed herein may also validate the use of expected and authorized applications. Thus, if an unauthorized user uses an expected and authorized application in an unexpected or unauthorized manner, the apparatus and method disclosed herein may block such access. The blocked access may be used, for example, to alert an application owner that the application may have been compromised.

FIG. 1 illustrates an architecture of a security and access control apparatus (hereinafter also referred to as "apparatus 100"), according to an example of the present disclosure. Referring to FIG. 1, the apparatus 100 is depicted as including a traffic analysis module 102 to receive traffic 104 that is related to an application tier (e.g., a presentation tier, a logic tier, or a database tier) of a plurality of application tiers, and that is to be routed to another application tier of the plurality of application tiers or that is to be routed within the application tier. The traffic 104 may include valid structured query language (SQL) queries 106, invalid SQL queries 108, or other traffic 110.

The traffic analysis module 102 may analyze attributes of the traffic 104 related to the application tier, determine an application related to the traffic 104 based on the attribute analysis, and determine a type of the traffic based on the attribute analysis. The attributes may include, for example, clauses, expressions, predicates, and statements in the traffic 104. A clause may be a constituent component of statements and queries. An expression may produce, for example, scalar values, or tables including columns and rows of data. Predicates may specify conditions that may be evaluated, and may be used to limit the effects of statements and queries. Statements may include a persistent effect on schemata and data, or may control transactions, connections, sessions, or diagnostics.

The apparatus 100 may operate as an inline layer 2/layer 3 network device where all of the incoming traffic 104 is passed through the apparatus 100, and is either blocked, routed to another destination, or passed through to an intended destination. The apparatus 100 may also include layer 3/layer 4 segmentation parameters for firewall functionality. The traffic analysis module 102 may detect and/or control an application on any port of the apparatus 100, including applications with persistent or proxied connections.

A policy enforcement module 112 may determine a policy from a plurality of policies 114 in an application whitelist 116. The policies 114 may be respectively directed to each application tier of the plurality of application tiers of applications 118. The policy enforcement module 112 may compare the type of the traffic 104 to the policy to determine whether the traffic 104 is valid traffic (e.g., the valid SQL query 106) or invalid traffic (e.g., the invalid SQL query 108, or the other traffic 110). Based on a determination that the traffic 104 is valid traffic, the policy enforcement module 112 may forward the valid traffic 106 to an intended destination of the valid traffic 106. Further, based on a determination that the traffic 104 is invalid traffic, the policy enforcement module 112 may forward the invalid traffic to a predetermined destination or block the invalid traffic.

The policies 114 may include certain types of SQL accesses (e.g., writes but not reads) from a web server to a database server that are permitted for one of the applications 118. Generally, the policies 114 may indicate what types of access are allowed for the applications 118. The policies 114 may include network characteristics of tiered servers, and information related to protocols and messages. As described in further detail with reference to FIG. 4, the policies 114 may also be separated based on each tier of each of the applications 118. The policies 114 may be defined, for example, by user of the apparatus 100, and as discussed in further detail herein, by a policy generation module 120, or static analysis tools that study the application code itself. The policies 114 may be defined to look at traffic flow between different application tiers, or within application tiers where the apparatus 100 is implemented as a VM or where the traffic from a virtual switch is routed to the apparatus 100.

The policy enforcement module 112 may identify the user of the apparatus 100 associated with the applications 118 and policies 114, as well as any group membership associated with the user, and apply the same policies 114 regardless of how or where the user is connected to the apparatus 100. The owner of an application may configure business logic that describes the policies 114 for which tiers of an application may communicate with which other tiers using which protocols or applications. Any traffic between application tiers that is not using an allowed protocol or application may be blocked by the policy enforcement module 112 as described herein. For example, the apparatus 100 may allow access to a database server from a web server (or application server) if the traffic is a legitimate SQL query.

The traffic analysis module 102 may analyze the attributes of the traffic 104, and based on the determination by the policy enforcement module 112, valid SQL queries 106 may be allowed to pass through to an intended destination (e.g., a database server). Thus, the apparatus 100 may inspect all packets related to the traffic 104, and based on the determination by the policy enforcement module 112, valid SQL queries 106 may be allowed to pass through to an intended destination (e.g., a database server). The invalid SQL queries 108 and the other traffic 110 may be blocked by the apparatus 100, or otherwise routed to another destination based, for example, on the policies 114.

The policy generation module 120 may inspect the traffic 104 from authorized and unauthorized applications. For example, the policy generation module 120 may inspect the ways that authorized applications are being used with the related traffic being allowed, and how unauthorized applications are being used with the related traffic being blocked. In this manner, the policy enforcement module 112 may operate in conjunction with the policy generation module 120 to block usage patterns that are not part of the designed usage patterns of an application. For example, the policy enforcement module 112 may operate in conjunction with the policy generation module 120 to allow certain types of SQL access from a web server to a database server (e.g., writes but not reads).

The policies 114 to be applied to the applications 118 may be determined from a set of pre-defined policies that describe common application use cases. The list of the policies 114 may be tuned according to the underlying machine readable instructions based tools that are in use, for example, for the particular type of web server or database server. In order to add further granularity to the policies 114, a developer of an application may interact with a user interface that guides the developer through the process of describing the nature of the application and the valid access patterns to be allowed between the various application tiers. The policy generation module 120 may monitor the traffic 104 and discover networking protocols and messages. The policy generation module 120 may display the discovered protocols and messages to users of the apparatus 100, and allow the users to select the protocols and messages associated with specific application tiers. The users may also know general protocol and message patterns used by application tiers, and provide such protocol and message patterns to the policy generation module 120. Alternatively or additionally, the policy generation module 120 may observe the access patterns between the various application tiers, and from the access patterns, the policy generation module 120 may synthesize a list of approved access patterns. Such training for the policy generation module 120 may be performed in a controlled environment to avoid the possibility of application compromise during the training process. A static analysis tool may also be used to create a set of authorized access patterns between the application tiers. For example, the static analysis tool may determine the underlying communication protocols and messages related to tiered application machine readable instructions. The use of a static analysis tool may facilitate the creation of a new security policy, and further facilitate the implementation of granularity to the policies 114.

Figure 2:
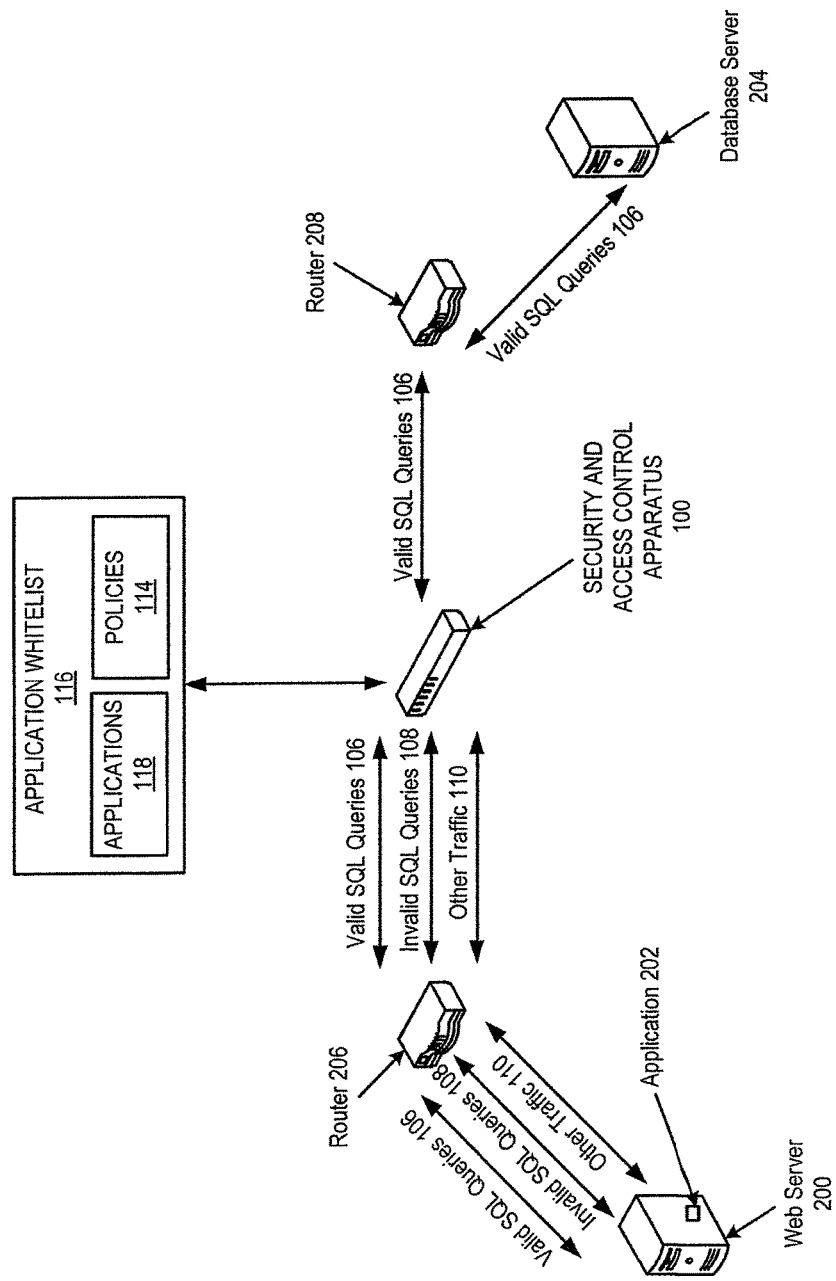
FIG. 2 illustrates operation of the security and access control apparatus with physical servers, according to an example of the present disclosure.

FIG. 2 illustrates an operation of the security and access control apparatus 100 with physical servers, according to an example of the present disclosure. As shown in FIG. 2, the apparatus 100 may be disposed between a physical web server 200 which hosts the presentation tier of an application 202 that performs computations within the architecture, and a database server 204. A router 206 may be situated between the web server 200 to capture the traffic (i.e., designated as 106, 108, and 110) from the web server 200, and to route the traffic to the database server 204 through the apparatus 100, and further via the router 208. An application server (not shown) may be similarly provided to host the logic tier of the application 202, with the apparatus 100 disposed between the application server and the database server 204. The apparatus 100 may inspect any traffic (e.g., designated as 106, 108, and 110) between the application tiers of the application 202. The apparatus 100 may also identify the specific application 202. Based on the analysis of the attributes of the traffic by the traffic analysis module 102, and based on the determination by the policy enforcement module 112, the valid SQL queries 106 may be allowed to pass through to the database server 204. Further, based on the analysis of the attributes of the traffic by the traffic analysis module 102, and based on the determination by the policy enforcement module 112, the invalid SQL queries 108 and the other traffic 110 may be blocked from passing through to the database server 204. Thus, the apparatus 100 may identify the application 202 being used from the applications 118 on the user-configurable application whitelist 116, and enforce the associated policies 114 to allow any traffic flows that are using application types or application versions that are permitted. Similarly, the apparatus 100 may enforce the associated policies 114 to block any traffic flows that are using application types or application versions that are not permitted. In this manner, even if the web server 200 is compromised, the web server 200 may not be used to gain unauthorized access to the database server 204. As discussed in further detail herein, the operation of the apparatus 100 with respect to FIG. 2 may be applicable to servers that are collocated or otherwise located in separate datacenters, and whether the application 202 is executed on a single web server 200 or multiple web servers 200.

Figure 3:
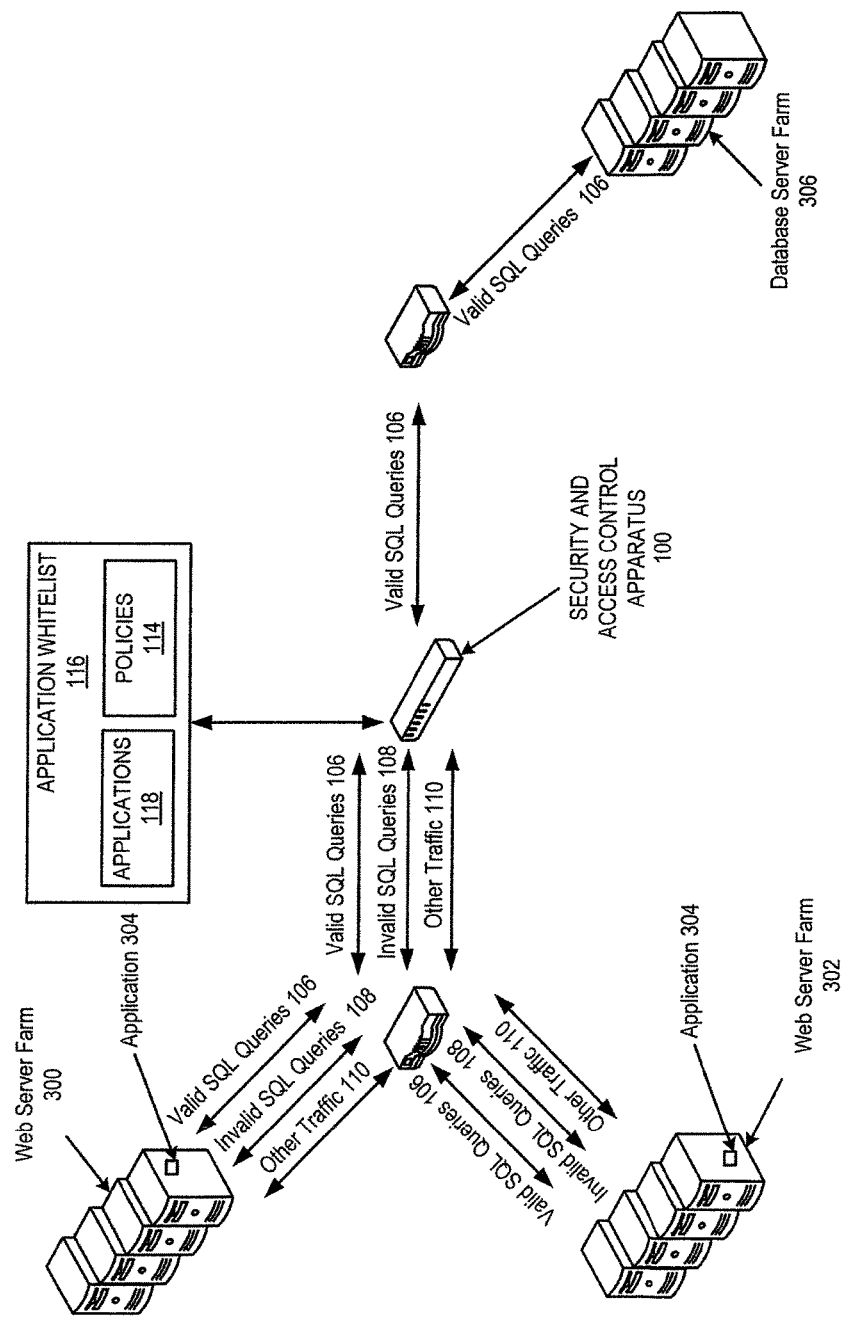
FIG. 3 illustrates operation of the security and access control apparatus with disparate servers, according to an example of the present disclosure.

FIG. 3 illustrates operation of the security and access control apparatus 100 with disparate servers, according to an example of the present disclosure. As shown in FIG. 3, the apparatus 100 may be disposed between physical web server farms 300, 302 which host the presentation tier of an application 304 for performing computations within the architecture, and a database server farm 306. As shown in FIG. 3, the apparatus 100 may be usable with architectures that include the application 304 that has been scaled to execute on multiple servers or in multiple datacenters. In a similar manner as shown in FIG. 2, the traffic between the application tiers of the application 304 may be passed through the apparatus 100.

Figure 4:
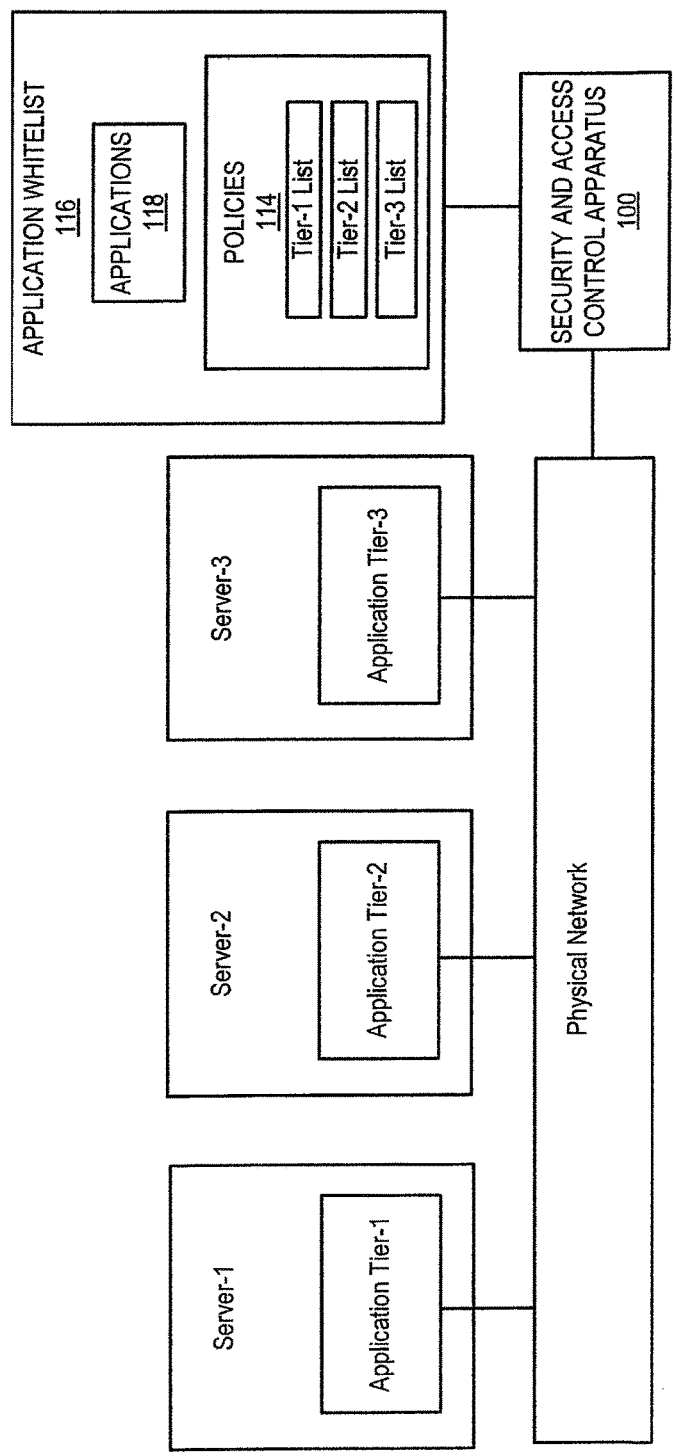
FIG. 4 illustrates a generalized implementation of the security and access control apparatus with multi-tiered applications, according to an example of the present disclosure.

FIG. 4 illustrates a generalized implementation of the security and access control apparatus 100 with multi-tiered applications, according to an example of the present disclosure. As shown in FIG. 4, the presentation layer (e.g., tier-1) of an application may be implemented on a server-1 (e.g., a web server), the business logic layer (e.g., tier-2) of the application may be implemented on a server-2 (e.g., an application server), and the persistence layer (e.g., tier-3) of the application may be implemented on a server-3 (e.g., a database server). Each tier of the application may use appropriate communication protocols and messages to perform cross tier functions. The apparatus 100 may monitor and detect protocols and messages, and validate the protocols and messages against the application whitelist 116. As discussed herein, the application whitelist 116 may include the policies 114 applicable to each of the tiers (e.g., tiers 1 to 3) of the applications 118.

The policy enforcement module 112 may apply the application whitelist 116 to a single application or to a plurality of applications that are being executed, for example, on a web server, that is using the same program files, and that is using the same computing resources, and the same network ports. For example, the same physical virtualization server may implement VMs that include the database servers for two separate n-tier web applications. The two database servers may be on the same physical virtualization server, perform similar tasks, and use the same network ports. However, based on the configuration of the application whitelist 116, each database server may include its own unique policy that protects the database server, allowing accesses that are appropriate and intended within their particular application.

Figure 5:
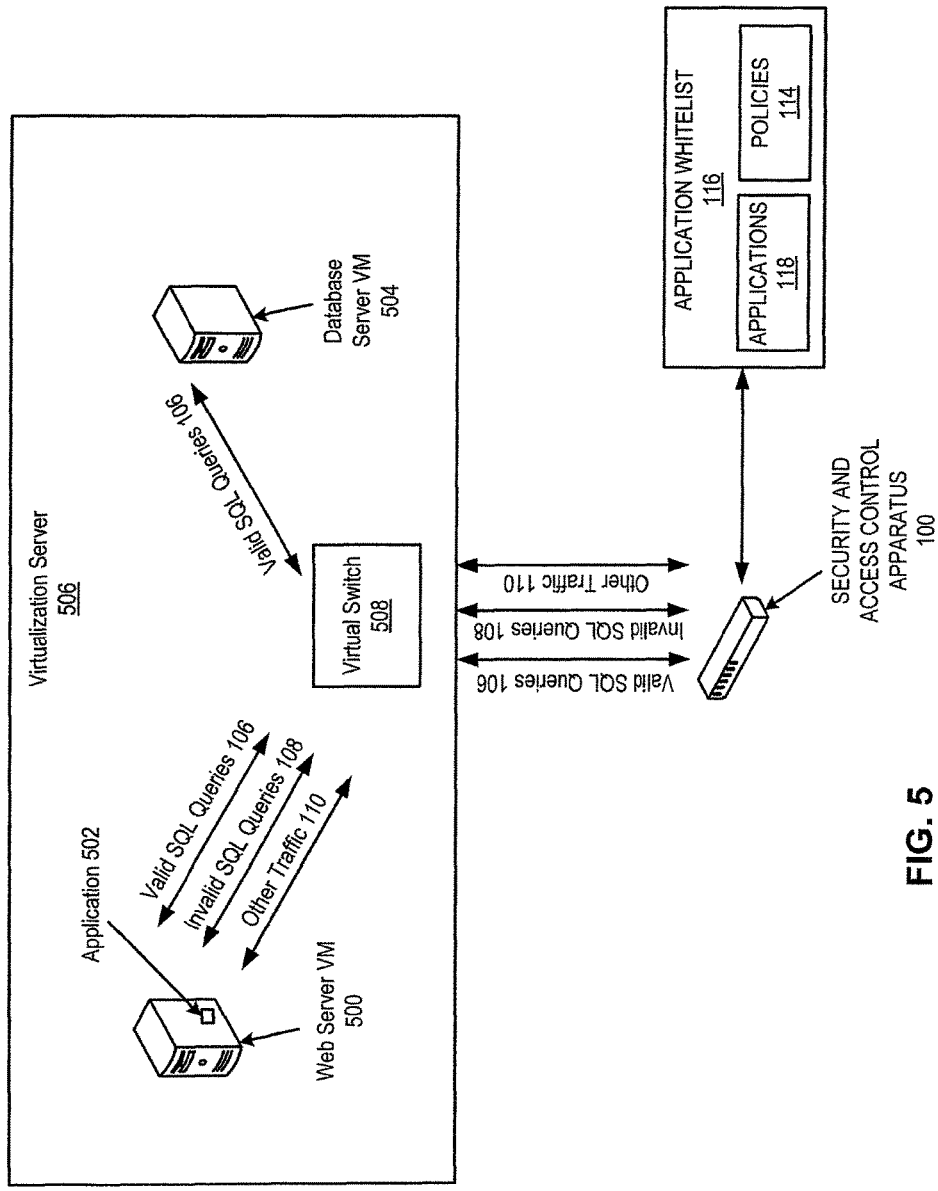
FIG. 5 illustrates operation of the security and access control apparatus with virtual servers, according to an example of the present disclosure.

In this respect, FIG. 5 illustrates operation of the security and access control apparatus 100 with virtual servers, according to an example of the present disclosure. As shown in FIG. 5, the apparatus 100 may be disposed between a web server VM 500 which hosts the presentation tier of an application 502 for performing computations within the architecture, and a database server VM 504. The apparatus 100 may be disposed between the web server VM 500 and the database server VM 504 as a physical apparatus 100, or as a virtual appliance running as a VM on a virtualization server 506. Alternatively, the apparatus 100 may be implemented as a virtual appliance on the virtualization server 506. A virtual switch 508 may route traffic from one VM to another VM (e.g., from the web server VM 500 to the database server VM 504), and/or to route traffic outside of the virtualization server to the apparatus 100.

Figure 6:
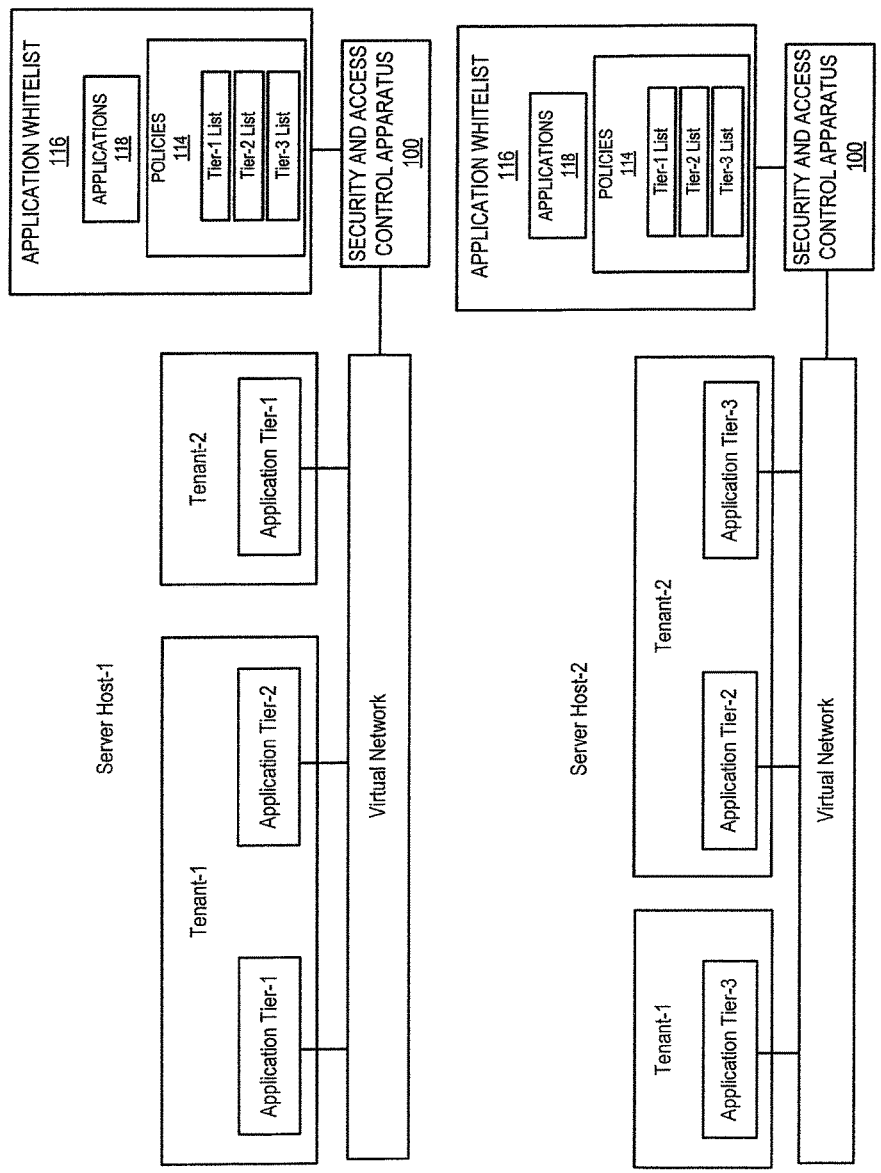
FIG. 6 illustrates virtual machine (VM) based multi-tenant multi-tiered applications for use with the security and access control apparatus, according to an example of the present disclosure.

FIG. 6 illustrates VM based multi-tenant multi-tiered applications for use with the security and access control apparatus 100, according to an example of the present disclosure. As shown in FIG. 6, multiple tenants may be implemented on the same physical server. For example, the server host-1 and the server host-2 may each include tenant-1 and tenant-2. For the server host-1, tenant-1 may implement application tier-1 and application tier-2, and tenant-2 may implement application tier-1. Further, for the server host-2, tenant-1 may implement application tier-3, and tenant-2 may implement application tier-2 and application tier-3. For the server host-1, tenant-1 may use the apparatus 100 to control traffic between application tier-1 and application tier-2, and at same time control traffic from tenant-2 generally. The application tier-3 for the tenant-1 may be on the server host-2. The application tier-2 and the application tier-3 for the tenant-2 may be on the server host-2. Thus, as shown in FIG. 6, each tenant may divide their traffic among multiple VMs divided across multiple physical servers, and those physical servers may be used by multiple tenants.

Figure 7:
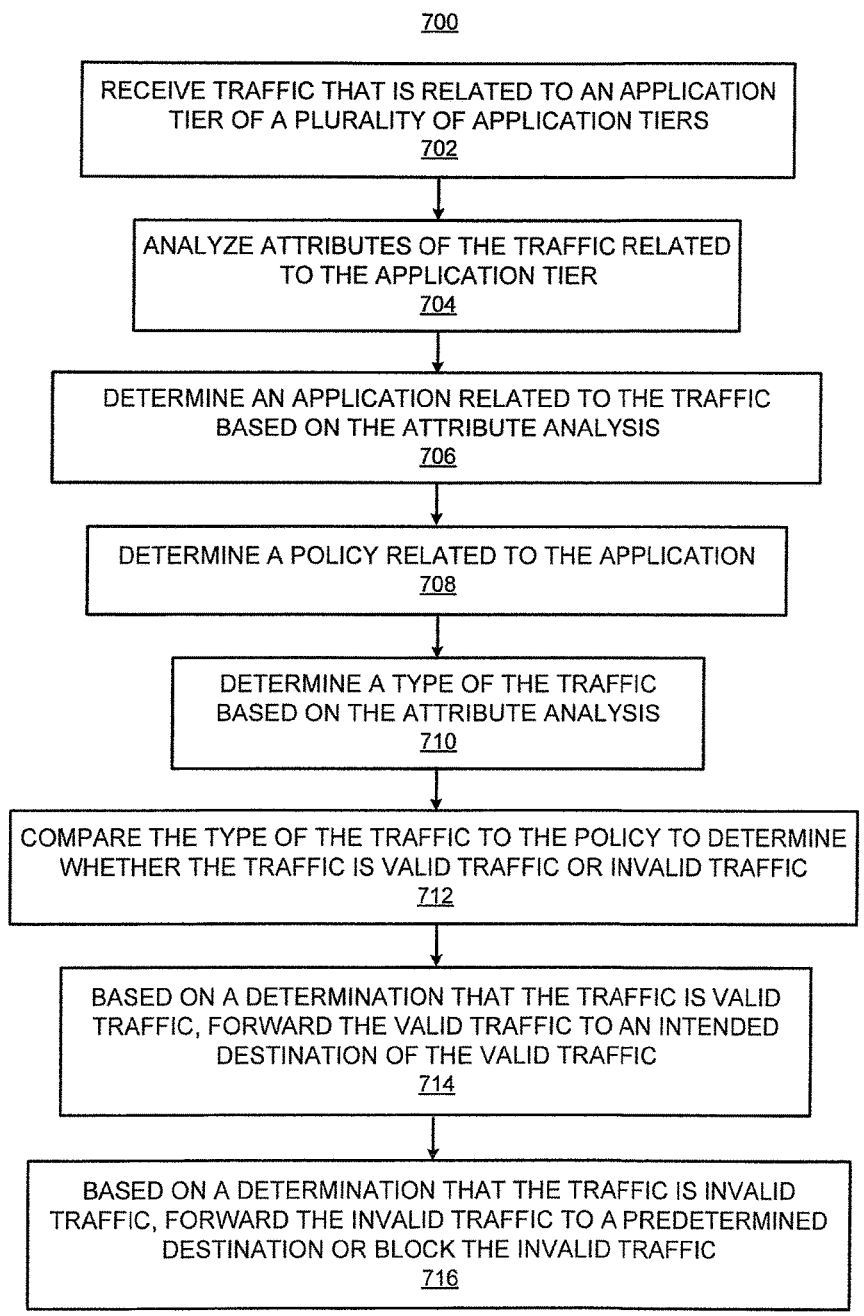
FIG. 7 illustrates a method for security and access control, according to an example of the present disclosure.
Figure 8:
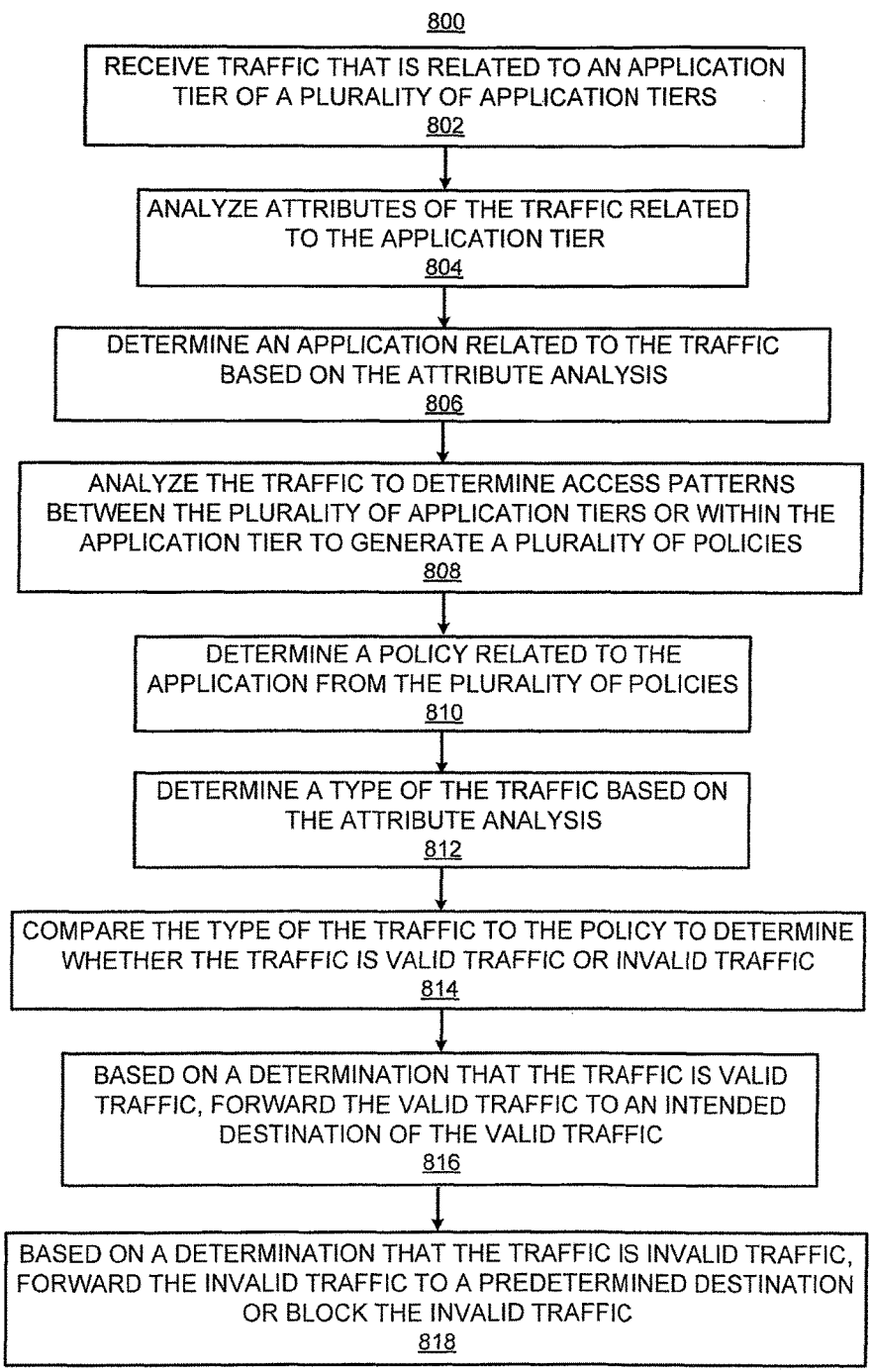
FIG. 8 illustrates further details of the method for security and access control, according to an example of the present disclosure.

FIGS. 7 and 8 respectively illustrate flowcharts of methods 700 and 800 for security and access control, corresponding to the example of the security and access control apparatus 100 whose construction is described in detail above. The methods 700 and 800 may be implemented on the security and access control apparatus 100 with reference to FIGS. 1-6 by way of example and not limitation. The methods 700 and 800 may be practiced in other apparatus.

Referring to FIG. 7, for the method 700, at block 702, the method may include receiving (e.g., by the traffic analysis module 102) traffic (e.g., the traffic 104) that is related to an application tier of a plurality of application tiers, and that is to be routed to another application tier of the plurality of application tiers or that is to be routed within the application tier. According to an example, receiving traffic that is related to an application tier of a plurality of application tiers may include receiving traffic that is related to the application tier of the plurality of application tiers that include a presentation tier, a logic tier, and a database tier.

At block 704, the method may include analyzing attributes of the traffic related to the application tier. According to an example, analyzing attributes of the traffic related to the application tier may include analyzing attributes that include a clause, an expression, a predicate, and/or a statement.

At block 706, the method may include determining an application related to the traffic based on the attribute analysis.

At block 708, the method may include determining (e.g., by the policy enforcement module) a policy related to the application. According to an example, determining a policy related to the application may include determining the policy from a plurality of policies (e.g., the policies 114) respectively directed to each application tier of the plurality of application tiers of the application (e.g., one of the applications 118).

At block 710, the method may include determining a type of the traffic based on the attribute analysis.

At block 712, the method may include comparing the type of the traffic to the policy to determine whether the traffic is valid traffic (e.g., the valid SQL query) or invalid traffic (e.g., the invalid SQL query 108, or the other traffic 110). According to an example, comparing the type of the traffic to the policy to determine whether the traffic is valid traffic or invalid traffic may include comparing the type of the traffic to the policy to determine whether the traffic is a valid SQL query or an invalid SQL query.

At block 714, based on a determination that the traffic is valid traffic, the method may include forwarding the valid traffic (e.g., the valid SQL query 106) to an intended destination of the valid traffic. According to an example, forwarding the valid traffic to an intended destination of the valid traffic may include forwarding the valid traffic to the another application tier of the plurality of application tiers.

At block 716, based on a determination that the traffic is invalid traffic, the method may include forwarding the invalid traffic to a predetermined destination or blocking the invalid traffic.

According to an example, the method may include analyzing the traffic to determine access patterns between the plurality of application tiers or within the application tier to generate the policy. According to an example, the method may include implementing the plurality of application tiers using components implemented in a virtual environment (e.g., see FIGS. 5 and 6).

Referring to FIG. 8, for the method 800, at block 802, the method may include receiving traffic (e.g., the traffic 104) that is related to an application tier of a plurality of application tiers, and that is to be routed to another application tier of the plurality of application tiers or that is to be routed within the application tier.

At block 804, the method may include analyzing (e.g., by the traffic analysis module 102) attributes of the traffic related to the application tier.

At block 806, the method may include determining an application related to the traffic based on the attribute analysis.

At block 808, the method may include analyzing the traffic to determine access patterns between the plurality of application tiers or within the application tier to generate (e.g., by the policy generation module 120) a plurality of policies. According to an example, analyzing the traffic to determine access patterns between the plurality of application tiers or within the application tier to generate a plurality of policies may further include generating the plurality of policies based on a predetermined granularity related to the traffic. For example, the policies 114 may correspond to various levels of user-defined analysis needed for the traffic 104 between the plurality of application tiers or within the application tier. For example, the granularity may be related to read/write aspects associated with the traffic 104, or other higher or lower aspects.

At block 810, the method may include determining a policy related to the application from the plurality of policies (e.g., the policies 114).

At block 812, the method may include determining a type of the traffic based on the attribute analysis.

At block 814, the method may include comparing (e.g., by the policy enforcement module 112) the type of the traffic to the policy to determine whether the traffic is valid traffic or invalid traffic.

At block 816, based on a determination that the traffic is valid traffic, the method may include forwarding the valid traffic (e.g., the valid SQL query 106) to an intended destination of the valid traffic.

At block 818, based on a determination that the traffic is invalid traffic, the method may include forwarding the invalid traffic to a predetermined destination or blocking the invalid traffic.

Figure 9:
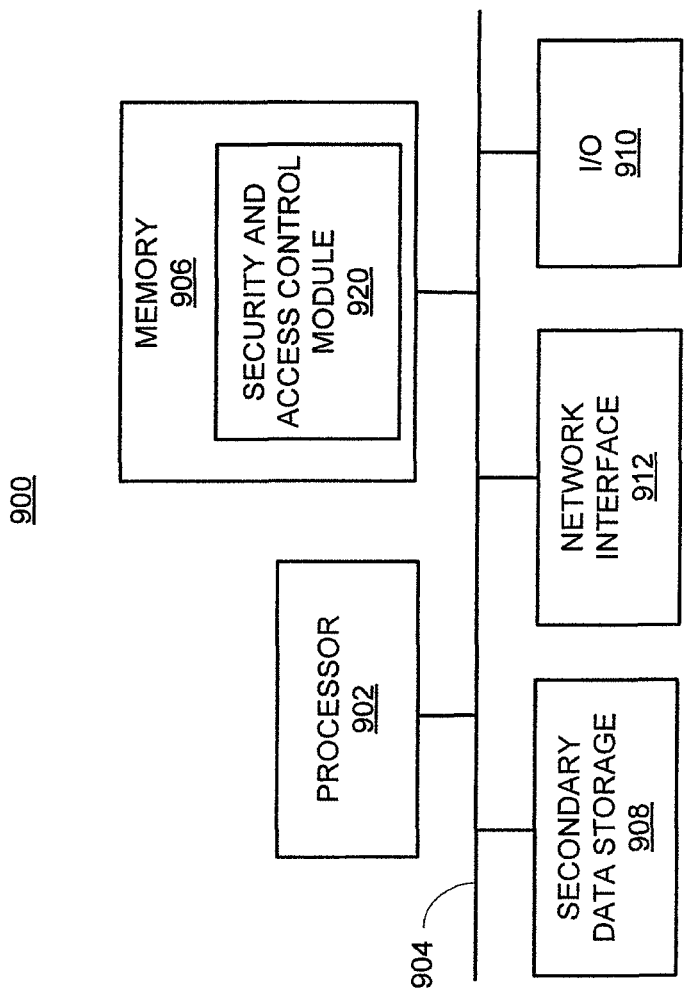
FIG. 9 illustrates a computer system, according to an example of the present disclosure.

FIG. 9 shows a computer system 900 that may be used with the examples described herein. The computer system may represent a generic platform that includes components that may be in a server or another computer system. The computer system 900 may be used as a platform for the apparatus 100. The computer system 900 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 900 may include a processor 902 that may implement or execute machine readable instructions performing some or all of the methods, functions and other processes described herein. Commands and data from the processor 902 may be communicated over a communication bus 904. The computer system may also include a main memory 906, such as a random access memory (RAM), where the machine readable instructions and data for the processor 902 may reside during runtime, and a secondary data storage 908, which may be non-volatile and stores machine readable instructions and data. The memory and data storage are examples of computer readable mediums. The memory 906 may include a security and access control module 920 including machine readable instructions residing in the memory 906 during runtime and executed by the processor 902. The security and access control module 920 may include the modules of the apparatus 100 shown in FIG. 1.

The computer system 900 may include an I/O device 910, such as a keyboard, a mouse, a display, etc. The computer system may include a network interface 912 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A non-transitory computer readable medium having stored thereon machine readable instructions to provide security and access control, the machine readable instructions, when executed by at least one processor of a computer, cause the computer to: receive traffic that is related to a first application tier of an application, the application comprising a plurality of application tiers that includes the first application tier and a second application tier, the traffic to be routed to the second application tier;
   analyze attributes of the traffic;
   determine the application based on the attribute analysis;
   determine a policy related to the application from a plurality of policies respectively directed to each application tier of the plurality of application tiers of the application;
   determine a type of the traffic based on the attribute analysis, the type of the traffic indicating whether the traffic is writing data to or reading data from the second application tier;
   compare the type of the traffic to the policy to determine whether the traffic is valid traffic or invalid traffic;
   based on a determination that the traffic is valid traffic, forward the valid traffic to an intended destination of the valid traffic;
   based on a determination that the traffic is invalid traffic, one of forward the invalid traffic to a predetermined destination and block the invalid traffic; and
   implement the plurality of application tiers using components implemented in a virtual environment.

2. The non-transitory computer readable medium of claim 1, wherein the plurality of application tiers comprises a presentation tier, a logic tier, and a database tier, wherein the first application tier is the presentation tier and the second application tier is the database tier.

3. The non-transitory computer readable medium of claim 1, wherein the application is an n-tier web application.

4. The non-transitory computer readable medium of claim 1, wherein the attributes include at least one of a clause, an expression, a predicate, and a statement.

5. The non-transitory computer readable medium of claim 1, wherein to compare the type of the traffic to the policy to determine whether the traffic is valid traffic or invalid traffic, the machine readable instructions, when executed by the at least one processor, further cause the computer to:
compare the type of the traffic to the policy to determine whether the traffic is a valid structured query language (SQL) query or an invalid SQL query.

6. The non-transitory computer readable medium of claim 1, wherein to forward the valid traffic to the intended destination of the valid traffic, the machine readable instructions, when executed by the at least one processor, further cause the computer to:
forward the valid traffic to the second application tier of the plurality of application tiers.

7. The non-transitory computer readable medium of claim 1, further comprising the machine readable instructions, that when executed by the at least one processor, further cause the computer to:
analyze the traffic to determine access patterns between the plurality of application tiers or within the application tier to generate the policy.

8. A security and access control apparatus comprising memory and at least one processor, the memory comprising machine readable instructions that when executed by the at least one processor cause the security and access control apparatus to: receive traffic that is related to a first application tier of an application that comprises a plurality of application tiers, the plurality of application tiers including the first application tier and a second application tier, the traffic to be routed to the second application tier;
analyze attributes of the traffic;
determine the application based on the attribute analysis;
determine a type of the traffic based on the attribute analysis, the type of the traffic indicating whether data is to be written to or read from the second application tier;
determine a policy from a plurality of policies respectively directed to each application tier of the plurality of application tiers of the application;
compare the type of the traffic to the policy to determine whether the traffic is valid traffic or invalid traffic;
forward the traffic to an intended destination when the traffic is determined to be valid traffic;
forward the traffic to a predetermined destination or block the traffic when the traffic is determined to be invalid traffic; and
implement the plurality of application tiers using components implemented in a virtual environment.

9. The security and access control apparatus according to claim 8, wherein the machine readable instructions when executed by the at least one processor further cause the security and access control apparatus to analyze the traffic to determine access patterns between the plurality of application tiers or within the application tier to generate the policy.

10. The security and access control apparatus according to claim 8, wherein the plurality of application tiers include a presentation tier, a logic tier, and a database tier,
wherein the first application tier is the presentation tier and the second application tier is the database tier.

11. A method for security and access control, the method comprising:
receiving traffic that is related to a first application tier of an application, the application comprising a plurality of application tiers that include the first application tier and a second application tier, the traffic to be routed to the second application tier;
analyzing attributes of the traffic;
determining the application based on the attribute analysis;
analyzing the traffic to determine access patterns between the plurality of application tiers to generate a plurality of policies;
determining a policy related to the application from the plurality of policies respectively directed to each application tier of the plurality of application tiers of the application;
determining a type of the traffic based on the attribute analysis, the type of the traffic indicating whether data is to be read from or written to the second application tier;
comparing, by at least one processor, the type of the traffic to the policy to determine whether the traffic is valid traffic or invalid traffic;
based on a determination that the traffic is valid traffic, forwarding the valid traffic to an intended destination of the valid traffic;
based on a determination that the traffic is invalid traffic, one of forwarding the invalid traffic to a predetermined destination and blocking the invalid traffic; and
implementing the plurality of application tiers using components implemented in a virtual environment.

12. The method of claim 11, wherein analyzing the traffic to determine access patterns between the plurality of application tiers to generate the plurality of policies comprises:
generating the plurality of policies based on a predetermined granularity related to the traffic.

* * * * *